May 27, 1952     J. R. HOLLINS     2,598,657
SWITCH FOR DIRECTIONAL AND CLEARANCE LAMPS
Original Filed Sept. 17, 1949
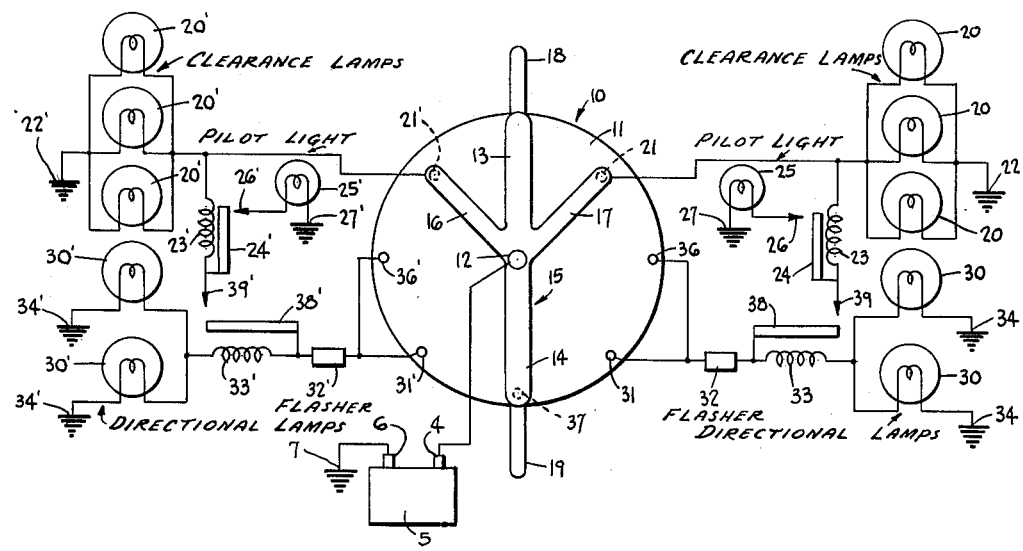
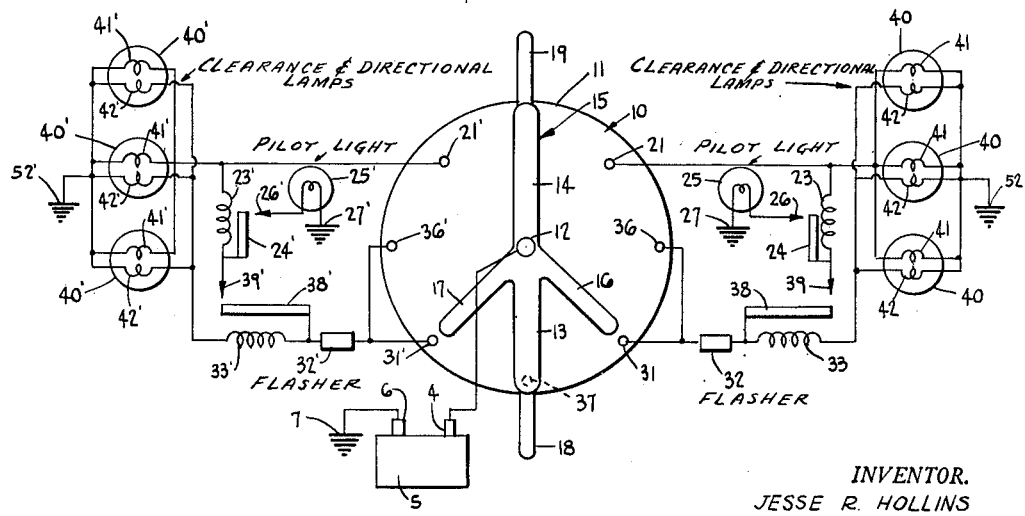
INVENTOR.
JESSE R. HOLLINS
BY
ATTORNEY

UNITED STATES PATENT OFFICE 2,598,657

SWITCH FOR DIRECTIONAL AND CLEARANCE LAMPS

Jesse R. Hollins, Brooklyn, N. Y.

Original application September 17, 1949, Serial No. 116,321. Divided and this application July 12, 1950, Serial No. 173,439

2 Claims. (Cl. 177—337)

This invention relates to vehicle signalling systems and more particularly to a novel switch and a novel circuit arrangement, whereby clearance lamps may be utilized as flashing directional signals, and whereby all of the signal lamps on a vehicle may be simultaneously flashed as an "emergency stop" indication, this application being a division of my copending application Serial No. 116,321 filed September 17, 1949, which matured as Patent No. 2,562,274 dated July 31, 1952.

Most modern motor vehicles are equipped with directional signal lamps on the front and rear of the vehicles, and these lamps are selectively energized to apprise an approaching or following vehicle when a turn is contemplated. Additionally, larger vehicles, such as trucks, are required by law to carry clearance or marker lights whereby other vehicles may be apprised of the width of the so-marked vehicle. As a general rule, the clearance lamps are steadily illuminated, whereas the turn signal or directional lamps are easily flashed so as to more readily attract the attention of other drivers.

The present invention is directed to a novel switch, and to a novel circuit combined therewith, whereby, when the signal lamps on one side of the vehicle are flashed to indicate a turn, the clearance lamps on that side of the vehicle are likewise flashed. The clearance lamps on the other side of the vehicle remain steadily illuminated, and the directional lamps on such other side of the vehicle remain extinguished. The switch has a further position in which all of the clearance lamps and all of the directional lamps are simultaneously flashed to indicate an "emergency stop" of the vehicle. A feature of the invention is a provision by means of which the switch may be reversed in position 180° so that it will have a "day" position and a "night" position. In the "day" position, the clearance lamps are illuminated only when a turn is signalled whereas, in the "night" position, the clearance lamps are steadily illuminated except when a turn is indicated.

As a further feature of the invention, the usual directional signal lamps may be omitted, and two-filament lamps may be used for the clearance lamps. With such arrangement, the clearance lamps are steadily illuminated through one set of filaments for normal night-time driving. When a turn is to be made, the other set of filaments of the lamps on one side of the vehicle is energized, in such manner that the clearance lamps on such one side have both of their filaments flashed to give a bright signal indication. During day-time driving, the "clearance" filaments are not energized, but both sets of filaments are flashed to indicate a turn.

With the foregoing in mind, it is an object of the present invention to provide a novel directional signal and clearance lamp control switch.

Another object is to provide a novel signalling circuit for motor vehicles by means of which clearance lamps may be selectively flashed simultaneously with directional signal lamps to indicate a vehicle turn.

Yet another object is to provide a combined switch and circuit by means of which all of the signal lamps on a vehicle may be simultaneously flashed to indicate an "emergency stop."

A further object is to provide a novel clearance lamp arrangement whereby the clearance lamps may be utilized, in place of the usual directional signal lamps, to indicate a turn of a vehicle.

These, and other objects, advantages and novel features of the invention will be apparent from the following description and the accompanying drawing. In the drawing:

Fig. 1 is a schematic wiring diagram of a switch and vehicle signalling circuit embodying the invention; and Fig. 2 is a schematic wiring diagram of an alternative embodiment of the invention.

Referring to Fig. 1, the novel control switch 10 of the invention is illustrated as arranged to selectively control the energization of clearance lamps 20, 20' and directional signal lamps 30, 30', the lamps 20 and 30 being arranged on one side of the vehicle and the lamps 20' and 30' on the other side of the vehicle. While only three clearance lamps are shown for each side of the vehicle, the number may vary in accordance with the length, width and height of the vehicle. The directional signal lamps 30, 30' are arranged, in the usual manner, near the right and left sides of the vehicle at the forward and rear ends thereof.

Switch 10 includes a mounting plate 11 of suitable insulating material having a central terminal 12 acting as a pivot for the movable switch member generally indicated at 15. Terminal 12 is connected to one terminal 4 of the usual vehicle battery, or other source of electric power 5, the other terminal 6 which is grounded as at 7. Movable switch member 15 includes aligned radial extending contact arms 13 and 14, and radially extending angularly related arms 16 and 17 which extend on either side of arm 13.

Member 15 has a "day" operating handle or extension 18 and a "night" operating extension or handle 19. In the "night" operation position of member 15, arms 16 and 17 are engaged with contacts 21 and 21', each respectively connected to one terminal of the parallel arranged clearance lamps 20 and 20'. The other terminals of the clearance lamps are grounded as at 22 and 22'. It should be noted that arms 16 and 17 are substantially shorter than arms 13 and 14.

Switch 10 includes contacts 31 and 31'. Contact 31 is connected through a flasher unit 32 and the operating coil of a relay 33 to one terminal of the directional signal lamps 30 on the right-hand side of the vehicle. These lamps are grounded as at 34. Contact 31' is similarly connected through a flasher unit 32' and a relay coil 33' to the grounded directional lamps 30' on the left-hand side of the vehicle. For a purpose to be described, switch 10 has a pair of diametrically opposite contacts 36, 36' respectively connected to contacts 31 and 31', and has a "dead" contact 37.

Relay 33 has an armature 38 which, when the relay is energized, connects flasher 32 to a contact point 39. Point 39 is connected through the coil of a relay 23 to the live terminals of clearance lamps 20. When relay 23 is energized, its armature 24 engages a contact point 26 connected to a pilot or indicator lamp 25 grounded at 27. A similar arrangement is provided for the clearance lamps on the left-hand side of the vehicle.

With switch 10 in the illustrated position, clearance lamps 20 and 20' are steadily illuminated from battery terminal 4 through terminal 12, arms 16 and 17, and contacts 21 and 21'. Should it be desired to indicate a right-hand turn of the vehicle, extension 19 is moved one position counter-clockwise. In this position, arm 14 engages contact 31 and arm 13 engages contact 21'. Contact 21 is disengaged. Under such conditions, left-hand clearance lamps 20' will continue to be steadily illuminated. Right-hand directional lamps 30 will be flashed through operation of flasher unit 32. Each time unit 32 is energized, armature 38 engages contact point 39 to flash right-hand clearance lamps 20 and operate relay 23. The latter effects an engagement of armature 24 with contact point 26 to flash pilot lamp 25 indicating that the circuit is in operating condition.

Should one or more of lamps 20 fail, there will be a drop in the current through coil 23 and this relay is so designed that the resulting drop across coil 23 will be insufficient to engage armature 24 with contact point 26, and the resulting failure of lamp 25 to light up will advise of a circuit defect. Likewise, relay 33 is so designed that if either lamp 30 is inoperative, the drop across coil 33 is insufficient to engage armature 38 with contact point 39. Consequently, the clearance lamps 20 will fail to flash and pilot lamp 25 will not be illuminated. This again will indicate a failure or defect of the circuits on the right-hand side of the vehicle. It should be noted that arms 16 and 17 are sufficiently short that they will engage only contacts 21 and 21' which are radially nearer to terminal 12 than are the other switch contacts.

A left-hand turn of the vehicle is indicated in the same manner as described by moving handle 19 clockwise one position, so that arm 14 engages contact 31' and arm 13 engages contact 21. As a result, lamps 20 will continue to be steadily illuminated whereas lamps 20' and 30' on the left-hand side of the vehicle will be flashed to indicate a turn. Should left-hand pilot lamp 25' fail to illuminate, it will indicate a defect in the circuits on the left-hand side of the vehicle.

Switch 10 has a position in which all of the lamps on the vehicle are flashed to indicate an "emergency stop." To achieve this effect, arm 19 is moved two positions in either direction so that arms 13 and 14 connect contacts 36 and 36' to battery 5 through terminal 12. In this position, both sets of lamps on each side of the vehicle are flashed through the flashing signal circuits previously described. This lighting arrangement provides effective wiring to prevent other vehicles from colliding with a standing vehicle, and the flashing lights amount to flashing flares insofar as warning effects are concerned.

Fig. 2 illustrates switch 10 in the "day" position. In the circuit arrangement illustrated in Fig. 2, directional lamps 30 and 30' are omitted and two filament clearance lamps 40, 40' are provided. Each lamp 40 has a pair of filaments 41 and 42, and each lamp 40' has a pair of filaments 41' and 42'. All of the filaments are commonly grounded at 52. Filaments 41 are commonly connected to contact 21 of switch 10. Filaments 42 are commonly connected to contact 31 of switch 10 in the same manner as lamps 30 of the arrangement of Fig. 1. The relating arrangement for flashing filaments 41 and pilot lamp 25 is the same as previously described. The circuits of the left-hand side of the vehicle correspond to those described for the right-hand side of the vehicle.

In the "day" position of switch 10, as shown in Fig. 2, contacts 21 and 21' are disengaged so that filaments 41 and 41' are not energized. Should it be desired, for example, to indicate a right-hand turn of the vehicle, handle 18 is moved one position counter-clockwise so that arm 14 engages contact 21' and arm 13 engages contact 31. It should be noted that arm 14 may be so designed as not to engage contact 21' in this position if it is desired that the left-hand filaments 41' not be illuminated steadily during flashing of the right-hand lamps. Filaments 42 are flashingly energized through 32, and filaments 41 are flashingly energized through operation of relay coil 33. A left-hand turn of the vehicle is indicated in a similar manner by moving handle 18 one position clockwise. When handle 18 is moved two positions in either direction, all of the filaments 41, 41', 42 and 42' are simultaneously energized to indicate an "emergency stop" condition.

If switch member 15 is reversed to the position of Fig. 1, for night driving, filaments 41 and 41' will be steadily illuminated. When a turn is indicated, a much brighter flashing signal will be selectively provided through energization of both sets of lamp filaments on one side of the vehicle through the flasher unit 32.

The representative ends 18 and 19 of member 15 can be appropriately marked so that the switch 10 may be placed in proper position for either day-time or night-time driving. Alternatively, only one operating handle could be provided and the switch casing appropriately marked for positioning of this one handle for day-time and night-time driving.

While specific embodiments of the invention have been shown and described in detail to illustrate the application of the invention principles, it should be understood that the invention may be otherwise embodied without departing from such principles.

I claim:

1. A vehicle signalling system comprising, in combination, a source of power, two sets of clearance lamps, one set arranged on each of the left and right sides of the vehicle and each lamp having a first filament and a second filament, a switch having a first pair of contacts each connected to the first filaments of a different set of clearance lamps, a second pair of contacts, and a movable contact member connected to said source, a pair of flasher units each connected to a different contact of said second pair, and a pair of relays each having a coil connected between a flasher unit and the second filaments of a different set of clearance lamps, each relay having a pair of contacts and being operable, when the relay coil is energized, to connect the first filaments of its associated lamps to its associated flasher unit, said movable member having a first position connecting both of said first pair of contacts to said source, and a second position connecting one contact of said first pair and the opposite contact of said second pair to said source, whereby both sets of lamps may be steadily illuminated or one set may have both filaments intermittently illuminated while the other set is steadily illuminated, to signal a turning movement of the vehicle.

2. A vehicle signalling system comprising, in combination, a source of power, two sets of clearance lamps, one set arranged on each of the left and right sides of the vehicle and each lamp having a first filament and a second filament, a switch having a first pair of contacts each connected to the first filaments of a different set of clearance lamps, a second pair of contacts, a third pair of contacts each connected to a different contact of said second pair, and a movable contact member connected to said source, a pair of flasher units each connected to a different contact of said second pair, and a pair of relays each having a coil connected between a flasher unit and the second filaments of a different set of clearance lamps, each relay having a pair of contacts and being operable, when the relay coil is energized, to connect the first filaments of its associated lamps to its associated flasher unit, said movable member having a first position connecting both of said first pair of contacts to said source, a second position connecting one contact of said first pair and the opposite contact of said second pair to said source, and a third position connecting both contacts of said third pair to said source, whereby both sets of lamps may be steadily illuminated, or one set may have both filaments intermittently illuminated while the other set is steadily illuminated, to signal a turning movement of the vehicle, or all the lamps may be concurrently flashed to signal an "emergency stop."

JESSE R. HOLLINS.

REFERENCES CITED

The following references are of record in the file of this patent:

UNITED STATES PATENTS

| Number | Name | Date |
|--------|------|------|
| 2,086,959 | Rom | July 13, 1937 |
| 2,090,332 | O'Neil | Aug. 17, 1937 |
| 2,172,068 | Murray | Sept. 5, 1939 |
| 2,238,394 | Murray, Jr. | Apr. 15, 1941 |